United States Patent
Arnon et al.

(10) Patent No.: US 12,109,760 B2
(45) Date of Patent: Oct. 8, 2024

(54) THREE-DIMENSIONAL OBJECTS PRINTING METHOD

(71) Applicant: MASSIVIT 3D PRINTING TECHNOLOGIES LTD., Lod (IL)

(72) Inventors: Gilad Arnon, Lod (IL); Erez Zimerman, Nes Ziona (IL); Ido De-La-Vega, Ramat Gan (IL)

(73) Assignee: Massivit 3D Printing Technologies LTD., Lod (IL)

( * ) Notice: Subject to any disclaimer, the term of this patent is extended or adjusted under 35 U.S.C. 154(b) by 566 days.

(21) Appl. No.: 17/296,247

(22) PCT Filed: Oct. 30, 2019

(86) PCT No.: PCT/IL2019/051176
§ 371 (c)(1),
(2) Date: May 23, 2021

(87) PCT Pub. No.: WO2020/110103
PCT Pub. Date: Jun. 4, 2020

(65) Prior Publication Data
US 2022/0126518 A1    Apr. 28, 2022

Related U.S. Application Data (60) Provisional application No. 62/772,171, filed on Nov. 28, 2018.

(51) Int. Cl.
*B29C 64/393* (2017.01)
*B29C 64/209* (2017.01)
(Continued)

(52) U.S. Cl.
CPC .......... *B29C 64/393* (2017.08); *B29C 64/209* (2017.08); *B29C 64/232* (2017.08);
(Continued)

(58) Field of Classification Search
CPC ... B29C 64/393; B29C 64/264; B29C 64/232; B29C 64/295; B29C 64/209; B33Y 10/00; B33Y 50/02
(Continued)

(56) References Cited

U.S. PATENT DOCUMENTS

| 6,401,002 B1 | 6/2002 | Jang |
| 6,505,089 B1 * | 1/2003 | Yang ..................... B33Y 50/00 700/98 |

(Continued)

OTHER PUBLICATIONS

International Search Report for corresponding PCT/IL2019/051176.
Written Opinion of the International Searching Authority for PCT/IL2019/051176.

*Primary Examiner* — Jeffrey M Wollschlager
*Assistant Examiner* — Xue H Liu
(74) *Attorney, Agent, or Firm* — Manelli Selter PLLC; Edward Stemberger (57) ABSTRACT

Described is an apparatus and method for the additive manufacturing of 3D objects. The apparatus includes a 3D object material deposition module configured to deposit a portion of material forming at least a layer of a 3D object, a 3D object material solidifying module configured to solidify at least the portion of material forming at least a layer of the 3D object and a control computer. The control computer includes a module configured to analyze the slope or curvature change ratio and operate material deposition module to deposit the 3D object material across the cross-section of the 3D object with at least one of a plurality of layers forming the 3D object that has different from other layers characteristics.

10 Claims, 8 Drawing Sheets

(51) Int. Cl.
*B29C 64/232* (2017.01)
*B29C 64/264* (2017.01)
*B29C 64/295* (2017.01)
*B33Y 10/00* (2015.01)
*B33Y 50/02* (2015.01)

(52) U.S. Cl.
CPC .......... *B29C 64/264* (2017.08); *B29C 64/295* (2017.08); *B33Y 10/00* (2014.12); *B33Y 50/02* (2014.12)

(58) Field of Classification Search
USPC ....................................................... 264/401
See application file for complete search history.

(56) References Cited

U.S. PATENT DOCUMENTS

| | | |
|---|---|---|
| 9,527,243 B2 | 12/2016 | Yakubov |
| 2015/0154320 A1 | 6/2015 | Umetani |
| 2017/0203515 A1* | 7/2017 | Bennett ................ B29C 64/393 |
| 2018/0311897 A1 | 11/2018 | Arnon |

* cited by examiner

THREE-DIMENSIONAL OBJECTS PRINTING METHOD

CROSS-REFERENCE TO RELATED APPLICATIONS

This application is the U.S. national phase of PCT Application No. PCT/IL2019/051176 filed on 30 Oct. 2019, which claims priority to U.S. Provisional Patent Application No. 62/772,171 filed on 28 Nov. 2018, the disclosures of which are incorporated in their entirety by reference herein. The present application also incorporates by reference U.S. Pat. No. 9,527,243 and U.S. patent application Ser. No. 15/578,766 to the same assignee.

TECHNOLOGY FIELD

The present disclosure relates to three-dimensional printing and in particular, to three-dimensional printing with layers of different height and width.

BACKGROUND

Three-dimensional printing is a generic term encompassing different additive manufacturing technologies such as inkjet printing, selective material deposition, material extrusion, material sintering, and others. The 3D object is produced by depositing a layer of material on top or bottom of previously deposited or dispersed layer of material and because of this is termed additive manufacturing (AM) process. In a large majority of cases the material from which the object is produced is a polymer that adheres to the previously deposited layer and is hardened or solidified by actinic radiation, such as ultraviolet radiation, thermal sources, and others.

Manufacturing of 3D objects spans over a large range of applications. This includes finished products or parts, prototype manufacture, decorations, sculptures, architectural models, and other physical objects. As the 3D objects manufacturing methods become more economical and faster, small runs of different products become manufactured. There has also been increase in requirements to the external appearance of the manufactured 3D objects surfaces of which are exposed to an observer.

Most of the 3D objects in addition to flat vertical and horizontal surfaces or segments included segments with complex shapes such as curved surfaces and surfaces that could overhang outside the main body of the object or in case a hollow object, protrude into a hollow void or cavity inside the object defined by the 3D object walls. The surfaces could be slanted, oriented at different angles and have different surface structure or relief.

The technologies used in 3D printing deposit a layer of material on top or bottom of previously deposited layer. The layer is of fixed height and width. For example, extrusion is a process, where the material from which the 3D object is manufactured is extruded through a nozzle from a solid filament or from liquid material. The nozzle has a constant diameter, and the extruded strip of material has about the same dimension/diameter. When slanted or curved surfaces are manufactured by extrusion, the constant height of an extruded layer generates a jaggy or step type surface appearance. To improve external appearance of the manufactured 3D object manual post-processing is applied to smoothen the jaggy surfaces.

3D objects are designed by Computer Aided Design (CAD) systems. For printing, the CAD generated 3D objects are sliced into slices corresponding to a single material layer. Recently introduced slicing software supports printing of layers of different height. The slicing facilitates manufacture of the 3D objects including 3D object segments with finer details. The software analyses a complete 3D object and areas indicated by the operator. It does not relate to the geometry of the manufactured object.

Definitions

"3D object"—as used in the current disclosure the term 3D object means a structure or a physical object that includes flat vertical, horizontal and slanted surfaces as well as curved surfaces.

"Curvature"—as used in the current disclosure the term curvature is the amount by which a geometric object deviates from being flat, or straight in the case of a line.

"Curvature change ratio"—as used in the current disclosure the term curvature change ratio means the ratio of the change in the angle or slope of a line tangent that moves over a given segment of a curve or arc. The first derivative defines a slope of the line tangent to the curve.

"Regular layer height/width"—as used in the current disclosure the term regular layer height/width means unaltered layer height or width as it is extruded from the nozzle.

"3D object material" or "object material"—as used in the current disclosure means the material from which the 3D object is manufactured.

"Frequency of layer height/width change"—as used in the current disclosure the term frequency of layer height or width change means deposited material height or width change by material dispensing means as a function of the 3D segment curvature or slant.

"Horizontal plane"—as used in the current disclosure horizontal plane means a plane normal to the gravitational force. Vertical plane is a plane perpendicular to the horizontal plane.

The terms "3D object" and "object" are used interchangeably in the current disclosure and have the same meaning.

SUMMARY

Described is an apparatus and method for additive manufacturing of 3D objects. The apparatus includes a 3D object material deposition module configured to deposit a portion of material forming at least a layer of a 3D object. A 3D object material solidifying module configured to solidify at least the portion of material forming at least a layer of the 3D object. A control computer is configured to receive a 3D object data and cause the material deposition module to deposit a plurality of layers forming the 3D object.

The control computer includes a module that also could be a standalone module or a computer configured to analyse the slope or curvature change ratio and operate material deposition module to deposit the 3D object material across cross-section of the 3D object with at least one of a plurality of layers forming the 3D object that has different from other layers characteristics. The different layer characteristics are the layer height and layer width. The layer height could be shorter or larger than a single regular layer height.

The different layer characteristics could be achieved by a change in the gap between the nozzle and substrate or previously deposited material layer; nozzle movement speed adjustment, material flow rate adjustment, and extrusion material temperature. The layer that has different from other layers characteristics supports reproduction of a smooths 3D object surface.

BRIEF DESCRIPTION OF THE DRAWINGS

The details of one or more examples of the subject matter described below are outlined in the accompanying drawings wherein identical referral numbers mark identical or similar parts.

DESCRIPTION

Currently, software for 3D printing uses the complete CAD generated 3D object to be manufactured (or printed) as the 3D object of analysis. The printing software and hardware slice the CAD generated 3D objects into slices corresponding to a single material layer. The finite height of the single material layer causes on slanted and curved surfaces of the 3D object a jaggy or step like relief visible to the observer.

Recently introduced 3D object slicing software supports the printing of layers of different height. The slicing software facilitates manufacture of the 3D objects including segments with finer details. However, the software analyses a complete 3D object and/or areas indicated by the operator. It does not relate to the geometry of the manufactured object.

The present document discloses an apparatus and method that support the manufacture of 3D objects, including curved walls and slanted surfaces. The apparatus and method alleviate or significantly reduce the need for post-manufacturing processing. The method and apparatus adapt the material layer height and/or width as a function of the 3D object segments analyses that define object segments that could be manufactured depositing a regular height layer, a layer higher than a regular layer height and a layer shorter than a regular layer height. The outcome of the analyses could be a change in the height of the extruded layer or in the width of the extruded layer or in both the height and width of the extruded layer.

The method and apparatus also adapt the material layer width as a function of the 3D object segments, including curved walls and slanted surfaces. For example, the manufacture of vertical, horizontal or slightly slanted surfaces (less than 15 degrees, for example) could be performed using material layers thicker or higher than the height of regular material layers. Manufacturing of slanted or curved surface or 3D object segments that include fine structure and require a more faithful reproduction could be manufactured by depositing material layers with height shorter than the height of regular layers.

Adaptation of the layer height or widths could be performed in several ways. Among them are: change in the gap between the nozzle and substrate or previously deposited material layer; nozzle movement speed adjustment, flow rate adjustment of the 3D object material, and extrusion material temperature.

In some examples, the geometry of the walls of the 3D object is such that certain space between the layers could be open. The extruded layers may not exactly be laid near or along with the previously deposited layer. Analyses of such segments of the 3D object could indicate a change in the width of the deposited layer.

Figure 1:
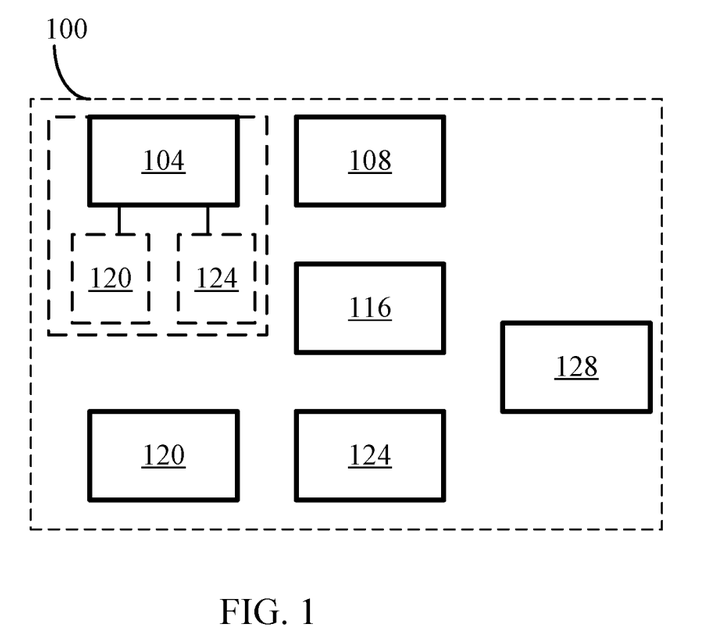
FIG. 1 is a schematic illustration of an example of an existing apparatus for additive manufacturing of 3D objects.

Reference is made to FIG. 1, which is a schematic illustration of an existing apparatus for additive manufacturing of 3D objects. Apparatus 100 includes a 3D object material deposition module 104 configured to deposit a portion or volume of material forming a segment of a layer 204 (FIG. 2) of a 3D object 200, a 3D object material solidifying module 108 configured to solidify at least the portion of material deposited and forming a segment of a layer 204 of the 3D object. Apparatus 100 also includes a computer 128 configured to receive the 3D object design data or information from a CAD system, adapt the 3D object design information to a particular manufacturing process, and control the apparatus for additive manufacturing of 3D objects.

Figure 2:
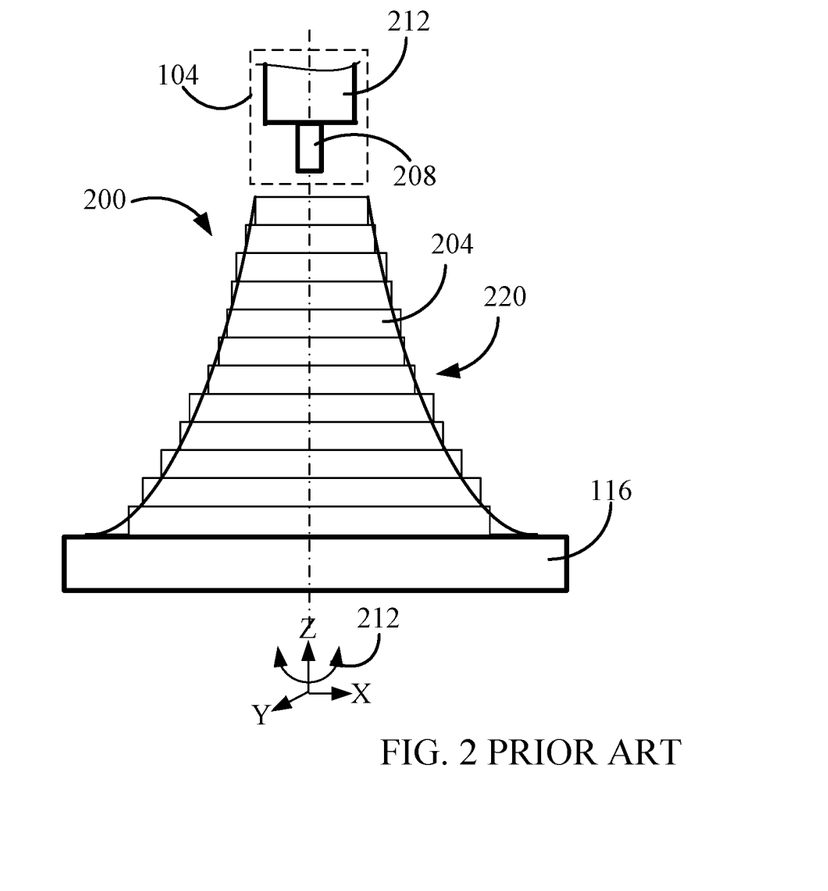
FIG. 2 is an example of a 3D object manufactured by existing 3D manufacturing methods and apparatuses.

FIG. 2 is an example of a 3D object manufactured by apparatus 100. 3D object 200 (FIG. 2) could be manufactured by employing material deposition module 104 to deposit a plurality of 3D object material layers 204 usually of identical shape and regular layer height, Material layers 204 are laid down or deposited on top (or bottom) of each of the preceding layer until the number of layers 204 results in a desired 3D object. In one example, the 3D object to be manufactured could be located on support or table 116 configured to move in three directions. The direction could be the known X, Y, and Z axes. Alternatively, instead of moving support table 116 in the three directions, material deposition module 104 could be configured to move in the three directions over the support table 116. In another example, the movement in the three directions could be split between support table 116 and material deposition module 104.

The material from which the layers of the 3D object are laid down could come in a variety of aggregate states. 3D object material solidifying module 108 is configured to solidify or convert these materials into a solid aggregate state. The solidifying module 108 (FIG. 1) typically solidifies 3D object 200 material layers 204 by material solidifying radiation or simply radiation. In some examples, the 3D object material could include the deposition of several different materials that solidify by a chemical reaction between them, for example, epoxy like materials. The radiation could be ultraviolet, infrared radiation, laser radiation, microwave radiation, and heat. Material solidifying module 108 could include a source of radiation-emitting one type of radiation or several radiation sources emitting different types of 3D object material solidifying radiation.

Solidifying module 108 could provide a flood illumination over the working area of table 116 or a spot illumination of just deposited material. In some examples, the solidifying module has freedom of movement, at least in one direction (Z). 3D object material solidifying module 108 solidifies the 3D object material by one of a group of radiations consisting of ultraviolet radiation, infrared radiation, microwave radiation, and heat. The radiation could be mono-chrome radiation and broadband radiation.

Figure 3:
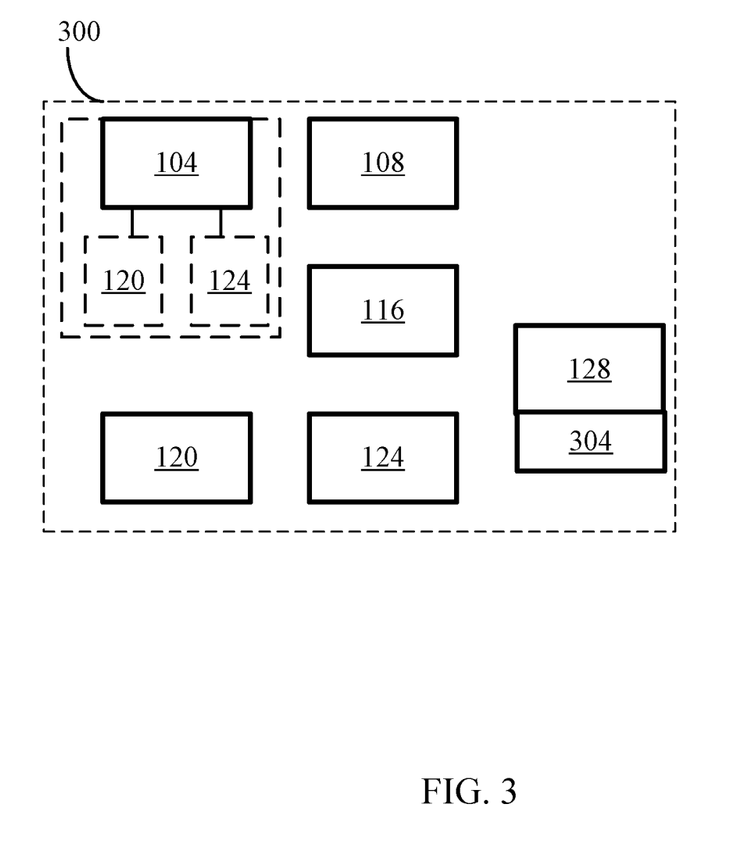
FIG. 3 is a schematic illustration of an example of the present apparatus for additive manufacturing of 3D objects.

FIG. 3 is a schematic illustration of an example of the present apparatus for the additive manufacturing of 3D objects. Apparatus 300 is similar to apparatus 100, although computer 128 configured to receive a 3D object data and cause the material deposition module to deposit a plurality of layers forming the 3D object includes a module 304, which in some examples could be an additional Personal Computer (PC). Apparatus 300 further includes a set of exchangeable nozzles 208 supporting extrusion of 3D object material in different sizes and cross-sections.

Usually, 3D objects include a mix of plane slanted and curved surfaces. Module 304 or computer 128 could be configured to analyse the slope or curvature of a particular segment of a 3D object and operate material deposition module 104 to dispense or deposit 3D object material across cross-section of the 3D object with one or more of a plurality of layers forming the 3D object that has different from other layers characteristics. The difference from other layers characteristics could include the layer height or width or both the height and width. Different height and/or width of the deposited layer could need a different amount of the 3D object material than it is contained in the regular layer height or width. The analyses include the examination of at least three layers, the layer to be printed, the layer above and the layer below the layer to be printed. Based on spatial difference between these three layers, resulting a gap, larger than certain percentage, for example 15% of the original layer height, corrections will be introduced.

Usually, to provide a smoother 3D object surface, the generated material layers would have a layer height, which would be smaller than a single regular layer height. Thus a regular layer height could be replaced by several layers with equal or variable height. However, in some examples, where higher throughput is desirable, and the 3D object surface supports this, e.g. vertical walls, the newly generated material layers would have a layer height which would be greater than the regular single layer height.

Figure 4A:
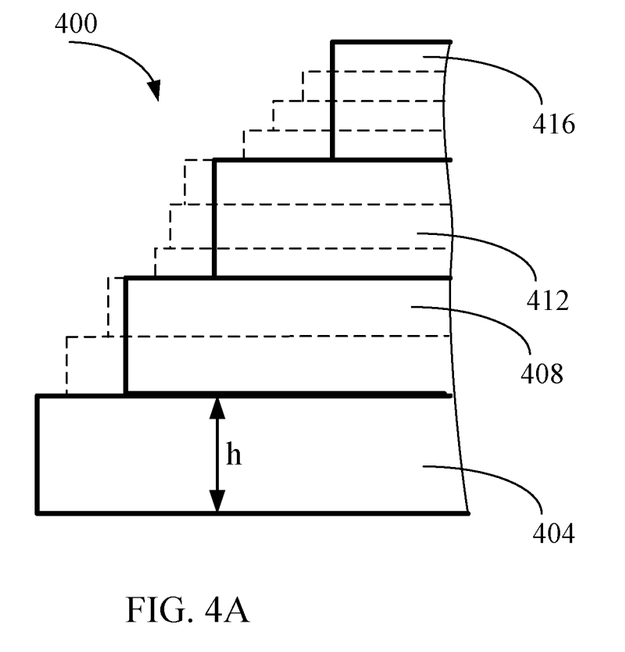
FIG. 4A is a schematic illustration of an example of a 3D object layers height change according to the presented manufacturing methods and apparatuses for additive manufacturing of 3D objects.

FIG. 4A is an example of a volume of a 3D object deposited according to the present variable resolution method. Object 400 deposited by apparatus 300 includes several layers of regular layer height h. Several layers of regular layer height h have been replaced by a number of layers of different height, for example layer 408 has a height which is half of layer 404 height. Layer 412 has a height which is a third of layer 404 height and layer 416 has a height which is a quarter of the 404 height. Any other heights of layers replacing regular layer height h is possible.

Figure 4B:
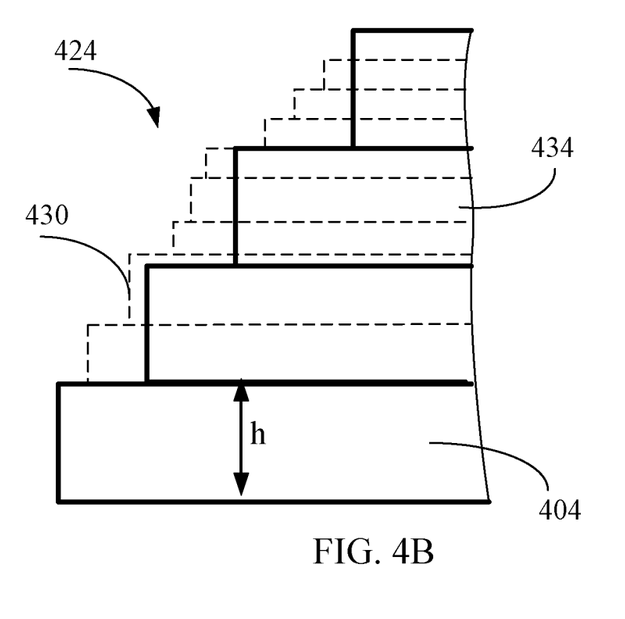
FIG. 4B is a schematic illustration of another example of a 3D object layers height according to the presented manufacturing methods and apparatuses for additive manufacturing of 3D objects.

FIG. 4B illustrates a layer 430, the height of which spreads at least in part over two regular layers height and layer 434 illustrates a split of layer 404 into several layers of different height. The division could be such that in one example some new or additional layers will include certain segments of a neighbor layer. Generally, it could be desirable to replace one layer with as many as possible since a large number of shorter height or thin layers would generate a better appearance. However, the technology parameters such as nozzle diameter, movement speed of material deposition module, material flow rate, and extrusion material temperature may limit the number of thinner layers that could be practical. For example, replacement of only few regular height layers with 3-5 shorter height or thinner layers will substantially benefit the 3D object appearance.

Figure 5:
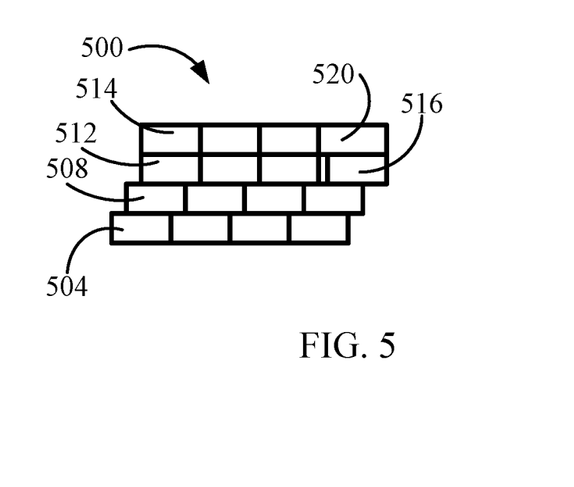
FIG. 5 is an example of a volume of a 3D object manufactured by the present 3D manufacturing apparatus.

FIG. 5 is another example of a volume of a 3D object deposited according to the present variable resolution method by 3D manufacturing apparatus 300. In some examples, the geometry of the walls of the 3D object is such that certain space between the layers could be open. The extruded layers may not exactly be laid near or along with the previously deposited layer. Analyses of such segments of the 3D object could indicate a change of the width of the deposited layer.

For example, the geometry of layer 512 is such that sub-layers or elements 516 have formed a gap. Sub-layer 520 of layer 514 could have a width larger than the regular layer width. Analyses of such segments of the 3D object could indicate need in change of the width of the deposited layer.

FIG. 5 is an example of a 3D object 500 manufactured by the present 3D manufacturing apparatus. In some examples, the different layer characteristics could include the amount of 3D object material being dispensed. Changes in the height and width of the extruded layer change the amount of the extruded material.

The 3D object curvature is typical of a second or higher-order curvature. It could have curvature maxima and minima points as well as curvature inflection point or points. At these points the layer characteristics of the deposited layer would change at a higher frequency than at other segments of the 3D object.

Figure 6:
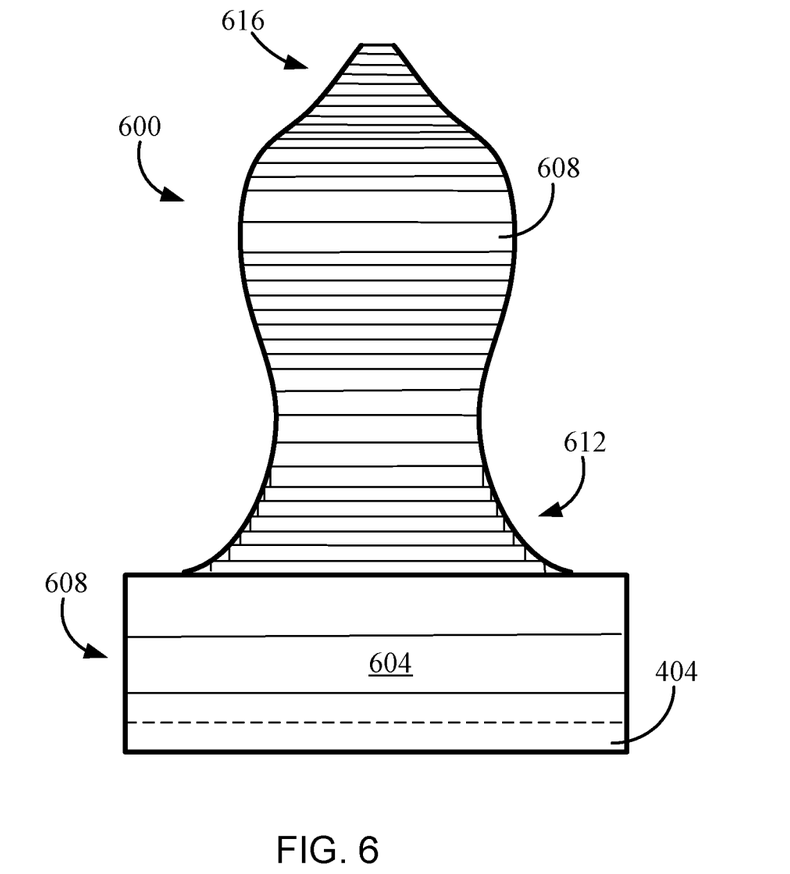
FIG. 6 is another example of a 3D object manufactured by the present 3D manufacturing apparatus.

FIG. 6 is another example of a 3D object manufactured by the present 3D manufacturing apparatus. 3D object 600 is a large size 3D object that includes segments or volumes with flat surface and surfaces of different curvature. 3D object 600 includes a segment 608 with vertical walls. According to the present method of 3D objects manufacture, segment 608 could be printed by dispensing material layers 604, the height of which is higher or greater than a single regular layer 404 height. 3D object 600 also includes segments 612 and 616, where the surface curvature changes fast. At these segments, the frequency of layer height or width change is fast. The frequency of layer height or width change means deposited material height change by material dispensing means as a function of the 3D segment curvature or slant.

Figure 7:
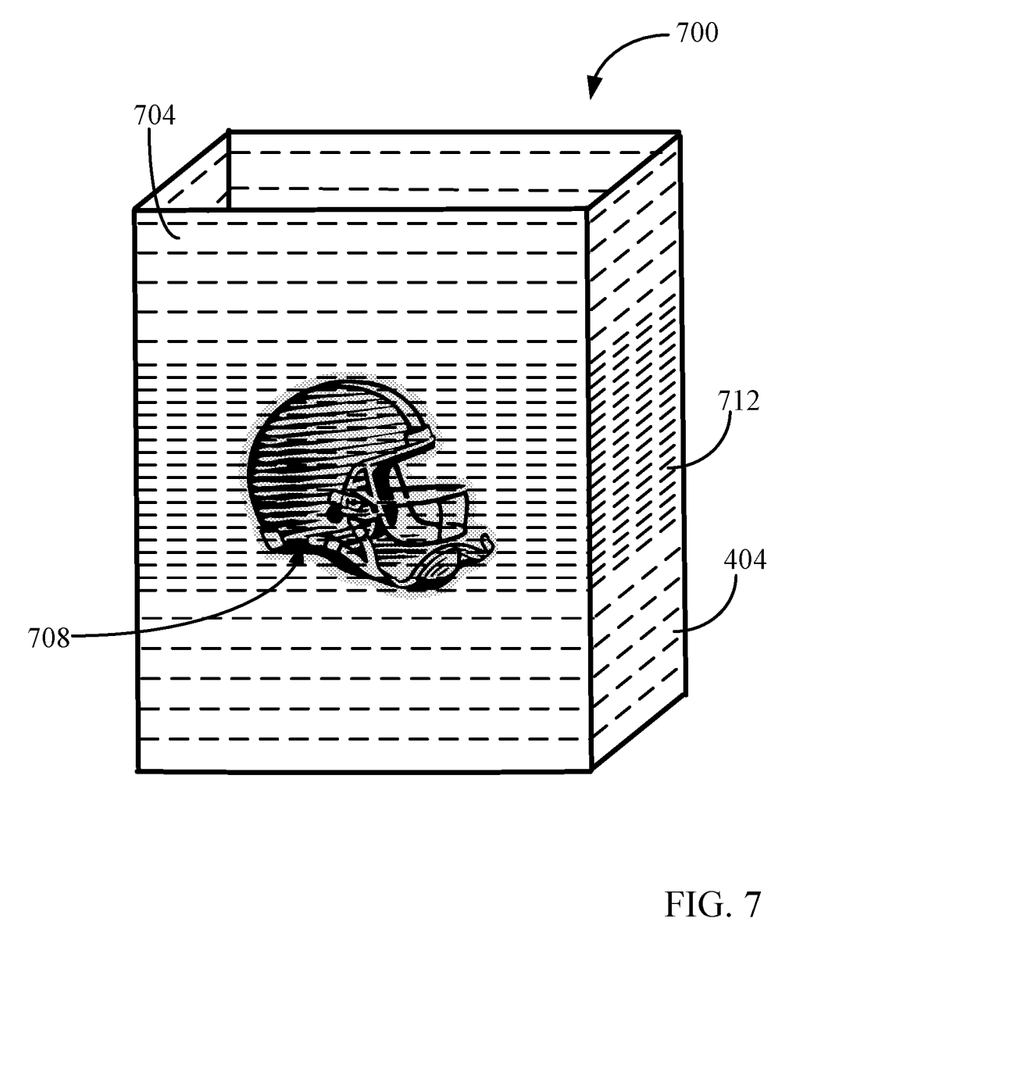
FIG. 7 is a further example of a 3D object manufactured by the present 3D manufacturing apparatus.

FIG. 7 is another example of a 3D object manufactured by the present 3D manufacturing apparatus. 3D object 700 is a large rectangular 3D object that includes flat vertical walls 704. According to the present method of 3D objects manufacture, such walls could be printed by dispensing material layers of higher than a single regular layer height. 3D object 700 also includes a segment 708 with finer details than the rest of 3D object 700. Depositing material layers 712 with height 3 to 10 times shorter than the regular layers 404 height, would result in a faithful reproduction of segment 708 features.

Figure 8:
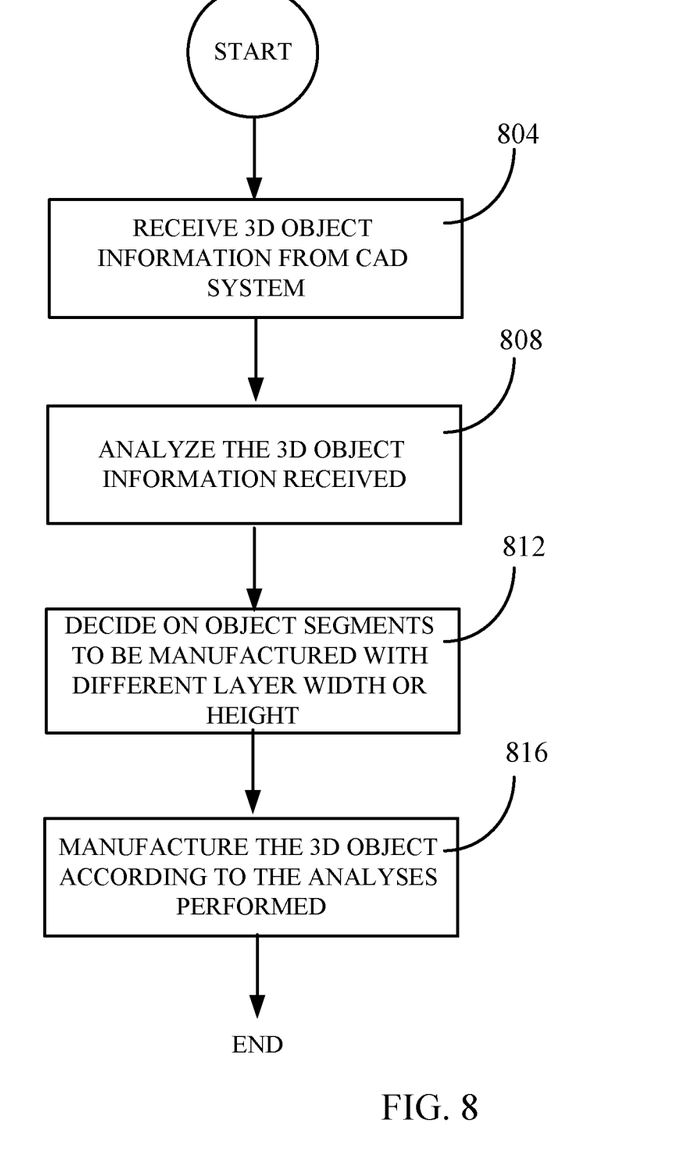
FIG. 8 is a schematic flowchart illustrating the present 3D object manufacturing process.

The method of printing variable height and/or width 3D object layers could be presented as a sequence of processes illustrated in FIG. 8. Upon reception of 3D object information from a CAD system (Block 804). The processor of computer 128 or 304 analyses the 3D object information (Block 808) received to detect 3D object segments that include sloped or curved elements and decides (Block 812) on object segments to be manufactured with different layer width and/or height. Computer 128 operates apparatus 300 to manufacture the 3D object (Block 816) according to the analyses performed.

The described method and apparatus expand state of the art and resolves the deficiencies of existing solutions, namely; introduces and supports a 3D object manufacturing method that allows the manufacture of 3D objects with smooth slanted and curved walls. By reducing the need for post-print processing the apparatus and method described substantially reduce the time and cost of additive manufacture of the 3D objects.

Although several examples have been explained, it should be understood that they are only for illustrating purposes and do not limit the apparatus and method. Those skilled in the art will appreciate that various modifications, alterations, and modifications are possible without departing from the scope and spirit of the present method and apparatus, as defined in the accompanying claims.

What is claimed is:

1. A method of 3D object printing, comprising:
   providing a 3D object manufacturing apparatus including at least a module configured to analyze a slope or curvature change ratio of a 3D object surface and operate a material deposition module to deposit 3D object material across a cross-section of a 3D object with at least one of a plurality of layers forming the 3D object that has a characteristic different from other layers; and
   manufacturing the 3D object by depositing, with the material deposition module, the 3D object material so that the 3D object includes the plurality of layers with the at least one layer that has a characteristic different from the other layers,
   wherein the characteristic that the at least one layer that is different from the other layers is layer height and/or layer width,
   wherein the at least one layer that has a characteristic different from the other layers is determined by the module analyzing at least three layers including the at least one layer prior to being printed, a layer above and a layer below the at least one layer.

2. A method of 3D object printing, comprising:
   providing a 3D object manufacturing apparatus including at least a module configured to analyze a slope or curvature change ratio of a 3D object surface and operate a material deposition module to deposit 3D object material across a cross-section of a 3D object with at least one of a plurality of layers forming the 3D object that has a characteristic different from other layers; and
   manufacturing the 3D object by depositing, with the material deposition module, the 3D object material so that the 3D object includes the plurality of layers with the at least one layer that has a characteristic different from the other layers,
   wherein the characteristic that the at least one layer that is different from the other layers is layer height and/or layer width,
   wherein adaptation of the characteristic of layer height and/or width is performed by one of a group of parameters consisting of a change in a gap between the material deposition module and previously deposited material layer; material deposition module movement speed adjustment, and extrusion material temperature.

3. The method, according to claim 2, wherein the layer height is shorter than a single regular layer height.

4. The method, according to claim 2, wherein the layer height is greater than a single regular layer height.

5. The method, according to claim 1, further comprising operating a 3D object material solidifying module configured to solidify at least the portion of the 3D object material forming at least a layer of the 3D object and forming at least a segment of the 3D object to be manufactured.

6. The method, according to claim 5, wherein the 3D object material solidifying module solidifies the material by one of a group of radiations consisting of ultraviolet radiation, infrared radiation, microwave radiation, and heat.

7. The method, according to claim 5, wherein the 3D object material solidifying module has a freedom of movement at least in one direction.

8. The method, according to claim 1, wherein the 3D object material deposition module is at least one of a group of modules consisting of an inkjet module, extrusion module, and sintering module.

9. A method of 3D object printing, comprising:
   providing a 3D object manufacturing apparatus including at least a module configured to analyze a slope or curvature change ratio of a 3D object surface and operate a material deposition module to deposit 3D object material across a cross-section of a 3D object with at least one of a plurality of layers forming the 3D object that has a characteristic different from other layers; and
   manufacturing the 3D object with the material deposition module by depositing the 3D object material from at least one nozzle of the material deposition module and without further mechanical manipulation of the material, so that the 3D object includes the plurality of layers with the at least one layer that has a characteristic different from the other layers,
   wherein the characteristic that the at least one layer that is different from the other layers is layer height and/or layer width,
   wherein the at least one layer that has a characteristic different from the other layers is determined by the module analyzing at least three layers including the at least one layer prior to being printed, a layer above and a layer below the at least one layer.

10. The method, according to claim 9, further comprising operating a 3D object material solidifying module configured to solidify at least the portion of the 3D object material forming at least a layer of the 3D object and forming at least a segment of the 3D object to be manufactured.

* * * * *